Feb. 21, 1933.    W. E. HARVIE    1,898,956
SAW ATTACHMENT FOR ELECTRIC DRILLS
Filed March 22, 1932    3 Sheets-Sheet 2
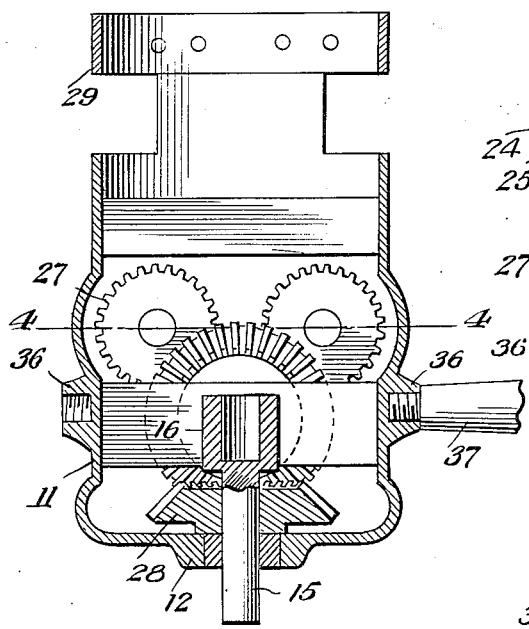
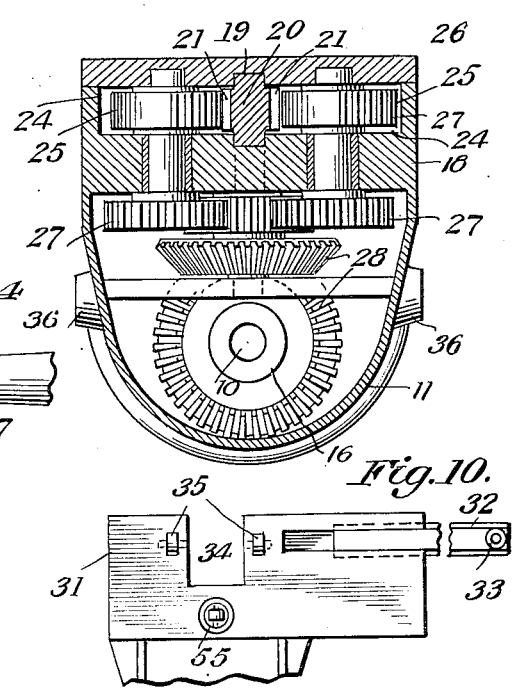
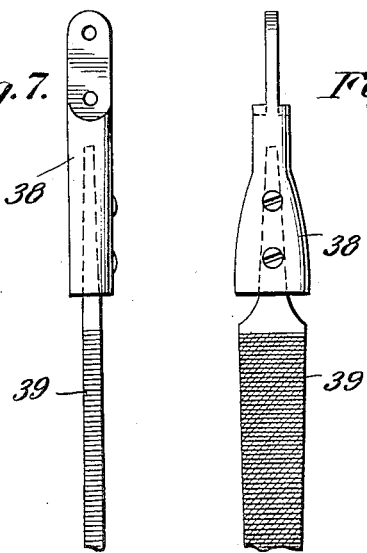
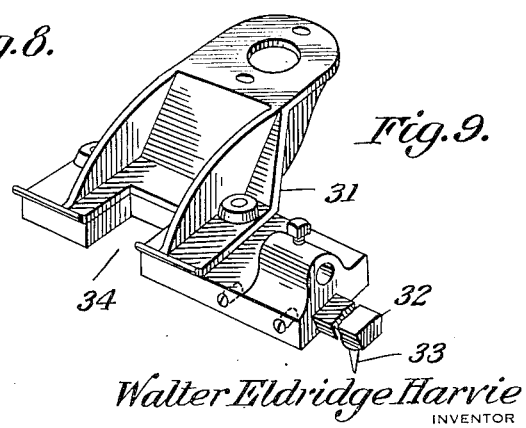
Walter Eldridge Harvie
INVENTOR
BY Victor J. Evans & Co.
ATTORNEYS

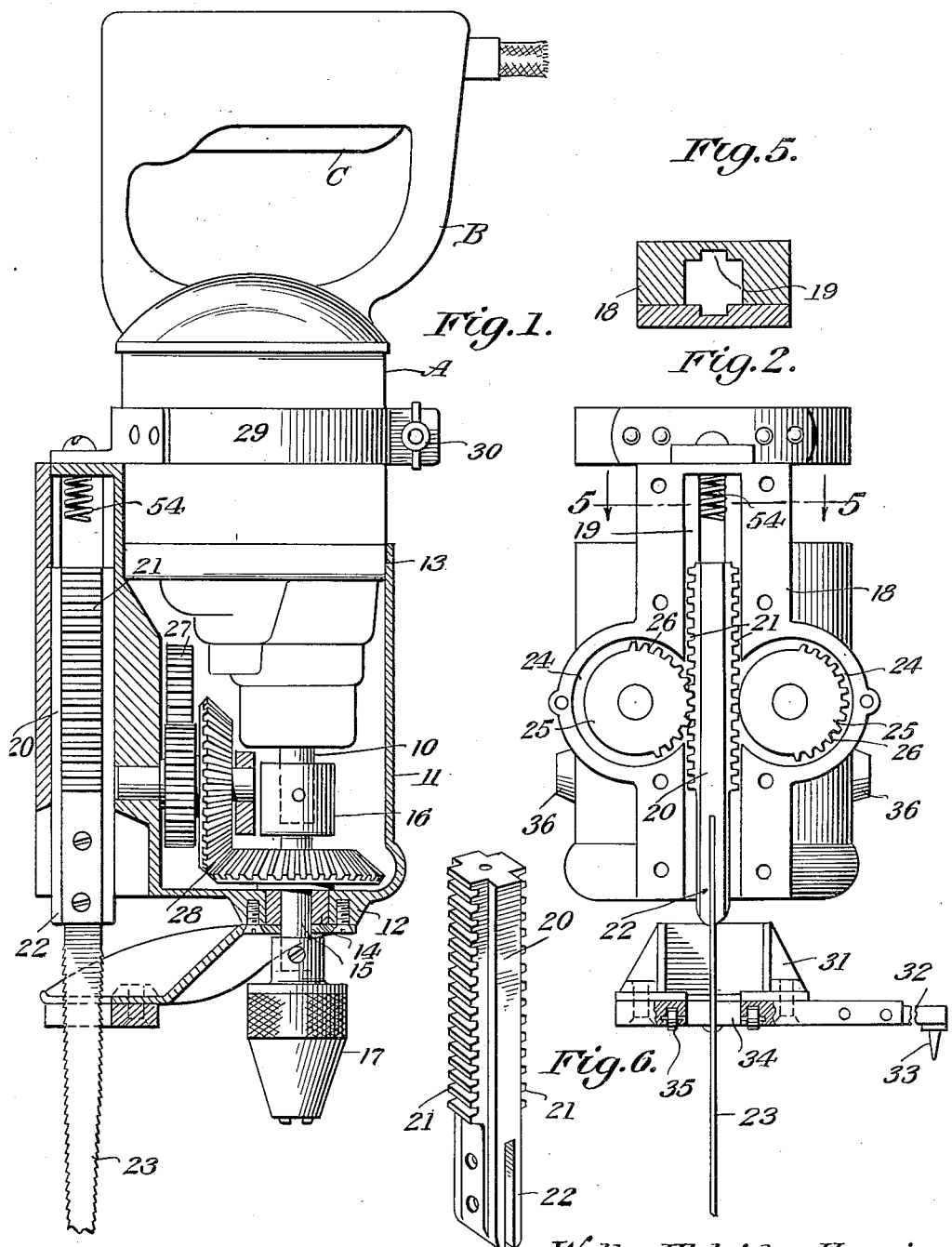

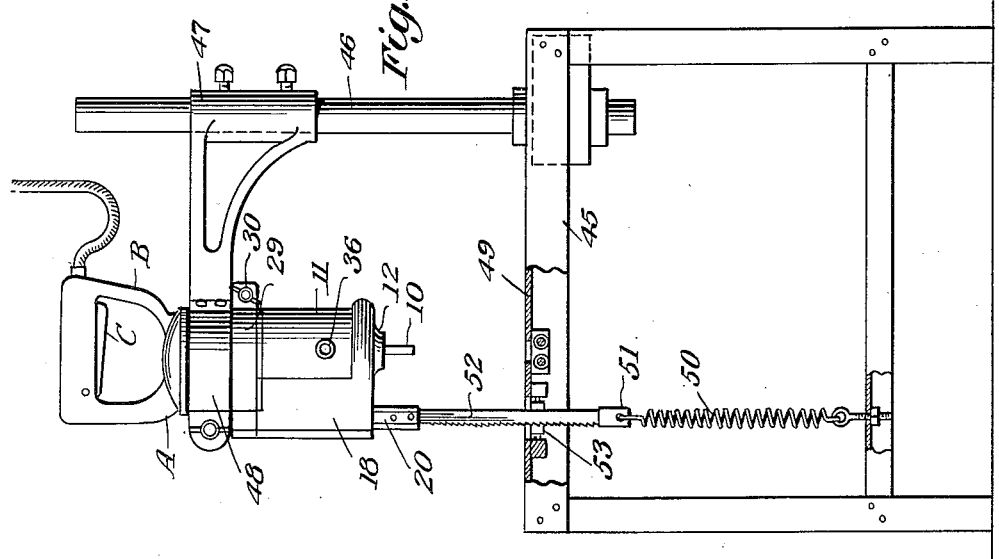
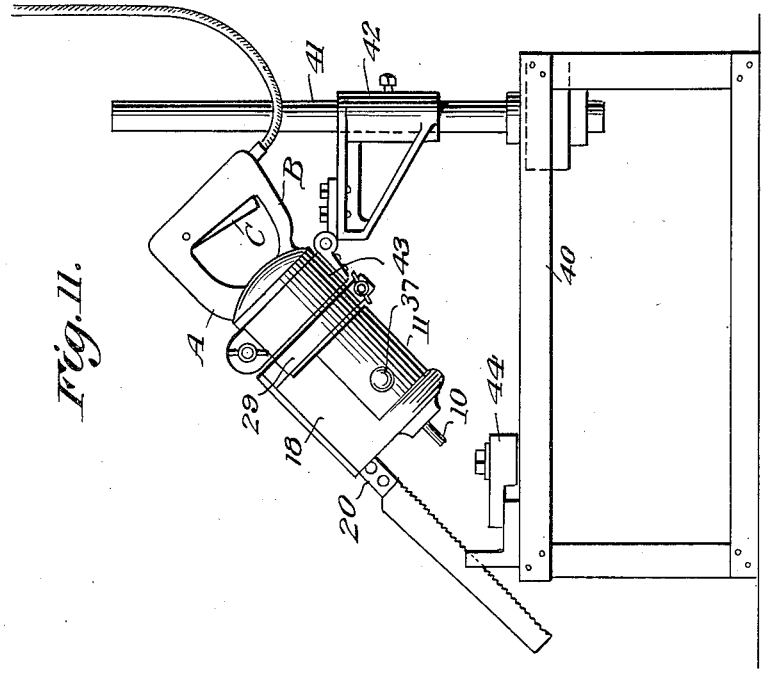

Patented Feb. 21, 1933

1,898,956

UNITED STATES PATENT OFFICE

WALTER ELDRIDGE HARVIE, OF PORTLAND, MAINE

SAW ATTACHMENT FOR ELECTRIC DRILLS

Application filed March 22, 1932. Serial No. 600,504.

The invention relates to a combination tool and more especially to a saw attachment for an electric drill.

The primary object of the invention is the provision of an attachment of this character, wherein the drill, which is of the electric type, can be utilized for drilling, mortising or other purposes and in its association with the attachment the latter can be utilized for various purposes, such as a hack saw, cutting off or splitting saw, or to take the place of a band saw, scroll saw and filing or other purposes, the attachment being of novel form so that it may be set for use upon a bench or support or the tool in its entirety can be rendered portable for its use when held in the hand of an operator.

Another object of the invention is the provision of an attachment of this character, wherein the drill may be converted so that the same is susceptible for drilling or sawing purposes and is useful for both wood and metal work by carpenters, boiler makers, structural steel workers, blacksmiths, machinists, ship fitters and builders, electricians, plumbers and steam fitters, and factory maintenance shops, or by artisans either of skilled or non-skilled grade.

A further object of the invention is the provision of an attachment of this character, wherein the construction thereof is novel in form and is readily mountable upon and demountable from an electric drill or other hand or power operated kind, the attachment when upon the drill serving as a unit therewith and permitting the converting of the latter for the execution of different kinds of work.

A still further object of the invention is the provision of an attachment of this character which is comparatively simple in construction, thoroughly reliable and efficient in its operation, strong, durable, readily and easily mounted and demounted from a drill and operable from its power motor and also inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 1 is a side elevation of a chuck drill showing the saw attachment constructed in accordance with the invention applied thereto and the same being in section.

Figure 2 is an elevation of the attachment removed from the drill and the same being partly in section.

Figure 3 is a vertical longitudinal sectional view through the attachment.

Figure 4 is a sectional view on the line 4—4 of Figure 3.

Figure 5 is a sectional view on the line 5—5 of Figure 2.

Figure 6 is a perspective view of the reciprocating rack plunger for the saw.

Figure 7 is an elevation of a file coupling for the saw attachment.

Figure 8 is a view similar to Figure 7 looking at right angles thereto.

Figure 9 is a perspective view of the gauge of the saw attachment.

Figure 10 is a bottom plan view thereof.

Figure 11 is an elevation of a stand and supporting bracket for the drill and saw attachment.

Figure 12 is an elevation of a slight modified form of stand.

Similar reference characters indicate corresponding parts throughout the several views in the drawings.

Referring to the drawings in detail, A designates generally an electric drill, the motor for driving such drill being of the rotary type (not shown). The casing of the drill A is formed with a handle B in which is fitted a grip trigger C, the latter constituting the control for the electric switch for closing the circuit to the motor of said drill and this trigger C is manually operated in the usual well known manner. The motor has its power shaft 10 projected exteriorly of the casing of the drill A and with this power shaft is connected the saw attachment hereinafter fully described and constituting the present invention.

The saw attachment comprises a housing or casing 11 having a closed end 12 and an opposite open end 13, the latter being adapted to receive and embrace a portion of the casing of the drill A in the mounting of the attachment thereon. The closed end 12 of the housing or casing 11 is formed with a bearing 14 in which is journaled a stud spindle 15, the same at its inner end formed with a coupling 16 for the shaft 10 of the motor of the drill A, the coupling 16 being of the detachable kind. The outer end of the stud spindle 15 has detachably fitted therewith a drill chuck 17 of any standard type.

At one side of the housing or casing 11 is an enlargement 18 having formed centrally therein a guideway 19 for a reciprocatory rack plunger 20, the latter formed with toothed racks 21 at opposite sides thereof and this plunger 20 is furcated at 22 for the detachable mounting therein of a saw blade 23, the furcation being at the outer end of the plunger. It is of course understood that the saw blades 23 can be of any type such as a hack saw, scroll or any form of cutting toothed saw.

Formed at opposite sides of the guideway 19 are recesses 24 in which are journaled mutilated toothed gears 25, the teeth 26 of which alternately mesh with the rack teeth 21 of the plunger 20 so as to reciprocate the latter within the guideway 19 in the operation of the tool.

The gears 25, through the medium of a train of gears 27 including the companion beveled meshing gears 28, are driven from the spindle 15 which when coupled with the shaft 10 transmits power from the motor of the drill A to the plunger 20 for the operation of the same. The motor of the drill A is started and stopped by manually operating the trigger C for controlling the switch of the circuit to the said motor.

The enlargement 18 has secured at its upper end a split ring-like clamp 29 which is adapted to embrace the body of the drill A and through a fastener 30 is detachably secured so that in this manner the saw attachment is made fast to the drill A as will be clearly obvious.

At the closed end 12 of the housing or casing 11 concentrically of the spindle 15 projected therethrough is a detachable guide 31 having an adjustable gauge 32 provided with a centering pin 33 and this guide is usable with the attachment when cutting circular work, the saw 23 being adapted to play through a throat 34 in said guide 31 and the under face of this guide carries bearing rollers 35 for engagement with the work during scroll sawing operation of the attachment or in cutting circular work, it being understood of course that the chuck 17 is removed from the spindle 15 when this character of work is being performed. The housing or casing 11 at opposite sides thereof is formed with screw threaded socketed bosses 36 for accommodating at either side or both thereof a supplementary hand grip 37 to facilitate the guiding of the tool during the operation thereof.

In Figures 7 and 8 there is shown a file holder 38 for a file 39 and this holder is adapted for detachable connection in the furcation 22 in substitute for the saw 23 so that the attachment can be used for filing purposes.

In Figure 11 of the drawings there is shown a supporting stand 40 having a vertical post 41 carrying an adjustable bracket 42 provided with a hinged clamp 43 for embracing the drill A so that the latter with the attachment can be utilized as a hack saw for cutting either steel or wood material, the material being held by a clamp 44 upon the stand 40.

In Figure 12 of the drawings there is shown a stand 45 having a post 46 carrying an adjustable bracket 47 in which the drill A is clamped through the medium of the clamp 48, while beneath the work bed 49 of this stand 45 and attached thereto is a coiled retractile spring 50, the same being detachably coupled at 51 with the saw blade 52 of the attachment. Thus it will be seen that in this mounting the tool can be used as a cutting off or splitting saw, the spring being designed to hold the saw 52 taut and the latter operates within a suitable guide 53 upon the bed 49 of the stand 45. In this mounting should the motor be turned clockwise approximately ninety degrees the saw would then be in position to take the place of a band saw and also function as a splitting saw.

It is of course to be understood that the train of gears 27 including the companion beveled meshing gears 28 can be varied in size with respect to each other to increase or decrease the speed of operation of the device.

Mounted in the guideway 19 at the inner end thereof is a spring 54 which functions as a cushioning element in the operation of the device.

The rollers 35 are disposed to travel in one direction while a supplemental roller 55 is carried by the guide 31 and this roller is swiveled so that the device can be revolved for use in scroll saw work or the same may be oscillative in the working thereof.

The drill A and the saw attachment as heretofore described is serviceable for many uses for wood working or metal working.

The saw attachment is readily removable from the drill A and the latter can be handled and operated in the usual well known manner as a single unit.

What is claimed is:—

The combination with a power mechanism having a housing with a motor provided with a driving shaft, of a casing open at one end and telescopically engaged at its open end with said housing, a clamp carried by the casing and embracing the housing for detachably uniting said casing and housing, an enlargement formed longitudinally of the casing and having a central guideway, a reciprocating rack plunger fitted in said guideway and having toothed racks at opposite sides, the plunger being formed with a furcated outer end, a tool detachably seated in said furcated end, and driven connections between the toothed racks and the driving shaft for the continuous reciprocation of the plunger.

In testimony whereof I affix my signature.

WALTER E. HARVIE.